US007356448B2

(12) United States Patent
Schaeffer

(10) Patent No.: US 7,356,448 B2
(45) Date of Patent: Apr. 8, 2008

(54) INPUT DEVICE OPERATING ON THE PARALLEL KINEMATIC PRINCIPLE WITH HAPTIC FEEDBACK

(76) Inventor: Albert Schaeffer, DE - 64404 Bickenbach, Lindgreenstrasse 6 (DE)

( * ) Notice: Subject to any disclaimer, the term of this patent is extended or adjusted under 35 U.S.C. 154(b) by 460 days.

(21) Appl. No.: 10/910,782

(22) Filed: Aug. 2, 2004

(65) Prior Publication Data

US 2005/0156877 A1 Jul. 21, 2005

Related U.S. Application Data

(63) Continuation of application No. PCT/DE02/04037, filed on Oct. 29, 2002.

(30) Foreign Application Priority Data

Oct. 29, 2001 (DE) ................................ 101 52 779

(51) Int. Cl.

*G06F 3/033* (2006.01)
*G02B 23/00* (2006.01)
*G09B 23/28* (2006.01)

(52) U.S. Cl. .............................. 703/6; 703/1; 606/130; 345/156

(58) Field of Classification Search .................... 703/6, 703/1; 606/130, 205; 623/25, 65; 74/471; 345/156

See application file for complete search history.

(56) References Cited

U.S. PATENT DOCUMENTS

| | | | | |
|---|---|---|---|---|
| 5,007,300 A | 4/1991 | Siva | ............................ | 74/471 |
| 5,731,804 A | 3/1998 | Rosenberg | .................. | 345/156 |
| 5,805,140 A | 9/1998 | Rosenberg et al. | ......... | 345/161 |
| 6,379,393 B1 * | 4/2002 | Mavroidis et al. | ............ | 623/25 |
| 6,853,965 B2 * | 2/2005 | Massie et al. | ................. | 703/6 |

(Continued)

FOREIGN PATENT DOCUMENTS

| | | |
|---|---|---|
| DE | 196 49 082 | 1/1998 |
| EP | 0 49 3795 | 7/1992 |
| WO | WO 9504959 | 2/1995 |
| WO | WO 9809580V | 3/1998 |

OTHER PUBLICATIONS

Dynamic Systems and Control Division Dsc, No. XP002249697, Lee—vol. 69-2, Nov. 2000, pp. 1299-1308 (A High-Bandwidth Force-Controlled Haptic Interface).

(Continued)

*Primary Examiner*—Thai Phan
(74) *Attorney, Agent, or Firm*—The Webb Law Firm

(57) ABSTRACT

The invention concerns an input device operating according to the parallel kinematic principle and with haptic feedback, in particular for medical teleoperation with instruments. The inventive input device comprises a frame (10, as well as a support element (30) mobile relative to the frame (10), and including a grip member (70), the frame (10) and the support element (30) being coupled with several linear force-sensitive actuators (20,21) articulated on both sides to the frame and to the support element. The invention is characterized in that the support element (30) includes a grip member (71) mobile relative to the first grip member (70) and at least one grip member (70,71) is coupled with a force-sensitive grip actuator (90). According to a preferred embodiment of the invention, six linear actuators (20,21) form two interlaced tripods whereof the tips are articulated to the support element (30) and are further mobile relative to each other in the direction of the support element, such that the grip actuator (90) is replaced by all six linear actuators (20,21). In another embodiment, an additional degree of rotational freedom is provided by means of a step motor (80).

18 Claims, 7 Drawing Sheets

U.S. PATENT DOCUMENTS

2003/0045888 A1* 3/2003 Brock et al. ................ 606/130
2004/0024418 A1* 2/2004 Irion et al. .................. 606/205

OTHER PUBLICATIONS

Haptic Interface—Research at the University of Colorado Online—XP002249698, May 26, 2003.

Bolte U: Das Aktive Stellteil . . . , vol. 17, No. 75, 1991, pp. 5-7, 36-47, 154-159, XP002071251.

Immersion Corporation, "Brings surgical simulation to unprecedented levels of realism", data sheet web page Apr. 6, 2002.

* cited by examiner

INPUT DEVICE OPERATING ON THE PARALLEL KINEMATIC PRINCIPLE WITH HAPTIC FEEDBACK

This is a continuation of a PCT application PCT/DE02/04037, filed Oct. 29, 2002, designating the United States, which claims priority from DE 101 52 779.9, filed Oct. 29, 2001, the disclosure of which is incorporated herein by reference.

DESCRIPTION

The resent invention relates to an input device operating on the parallel kinematic principle with haptic feedback for a computer, in particular for medical teleoperation with instruments, according to the preamble of claim 1.

Input devices of this kind are required for preference for tricky manipulations which a person has to perform with feel on objects not directly himself by means of hand power but remotely by means of an auxiliary machine or a robot. Usually, these are complex activities which require flexible manual intervention by the operator and for which exclusively visual checking of the activities of the robot is not sufficient. For this, the operator, who is usually physically separated from the place of work, receives important additional information independent of the visual sensory channel through haptic feedback from the input device. The haptic sensory channel which provides both tactile and kinaesthetic impressions, allows the operator to grasp and feel the position, orientation, weight and inertia of the robot and a tool which may possibly be fitted to it for example. In addition, the operator can obtain information about the object to be manipulated itself, such as its size, shape, strength and surface finish for example. Thus, with the aid of the robot and the input device, the operator can detect the working environment completely by touch and feel the effect of his remote actions—with or without additional visual checking. Typical areas of application for such telenavigation or teleoperation are operations in hazardous surroundings such as for example in nuclear power stations, underwater or in space. Control of construction machines, defusing of bombs and in particular telesurgery are further application examples in which the haptic feedback of a (remote) input device is desirable or even essential.

However, such input devices can also be used for computer-aided simulation of the manipulations described above on objects or human bodies, such as for testing, teaching and training purposes for example. Here, both the tool to be manipulated, possibly without a robot, and the object to be worked on are only present virtually in a computer or on its screen. In the simplest case, this can be a mouse pointer or a finger illustrated on a graphic user interface with buttons.

Obviously, input devices of this kind can also be used in combinations of real and virtual manipulation or haptic feedback.

Input devices with haptic feedback for computers are already known. An input device of this kind operating on the parallel kinematic principle is described in "A High-Bandwidth Force-Controlled Haptic Interface", C. D. Lee, D. A. Lawrence, L. Y. Pao, Proc. ASME Dynamic Systems and Control Division, DSC Vol. 69-2, ff. 1299-1308 , Orlando, Fla., November 2000, (s.a. http://web.archive.org/2001*/http://osl-www.colorado.edu/Research/haptic/hapticlnt The device developed at the University of Colorado exhibits five linear actuators each with a rod-shaped traction/thrust element. The linear actuators or their traction/thrust rods essentially form a bipod and a tripod the foot ends of which are individually articulated movably on a common frame and the vertex ends of which are each coupled movably through multiple articulations to a carrier element which is also rod-shaped. In addition, a pin-like grip is arranged on the carrier element. In all, this input device offers five mechanical degrees of freedom with haptic feedback and two on/off buttons arranged on the grip, with actuators and buttons connected to a computer. A major disadvantage of this device is that its operation necessitates intervention in its delicate structure consisting of the five linear actuators and the grip, during which in certain circumstances the hand or the underarm of the operator may collide with the actuators. This can cause undesired control effects, damage the device or even lead to injuries to the lower arm. In addition, only five active degrees of freedom are available and the buttons on the grip of the carrier element only allow Boolean information to be entered.

In addition, a device is known which was called "Spider" for short and which was continuously developed in the 90s in the Faculty of Ergonomics at the Technical University of Munich. This is described among other things in the dissertation "Das Aktive Stellteil—ein ergonomisches Bedienkonzept", Bolte Uwe, 1991, (s.a. http://web.archive.org/web/2001*/http://www.ergonomie.tum.de/~rausch/Spinne/spider.htm). The device connected to a computer unit essentially consists of a parallel kinematic six-axis drive and an operating knob. Here, the drive comprises six spindles which are driven by stepper motors and arranged in pairs forming a tripod, in which each leg consists of two spindles guided roughly parallel to one another. At the vertex of the tripod there is the operating knob which is coupled to the spindles through a triangular plate. The device provides force feedback with six degrees of freedom, with the operating knob itself passive. Because of the inert and coarse motor function, the device is not suitable for tricky manipulations such as are necessary for example for handling or remote control of surgical instruments. In addition, the range of action of the device is very limited so that it is only possible to work on a larger range with the aid of corresponding magnifications of more than one. Apart from the bare navigation of a connected robot, this device does not provide additional tool functions with the corresponding haptic feedback.

Lastly, an input device with five degrees of freedom and haptic feedback for medical operating purposes is known from U.S. Pat. No. 5,731,804 and U.S. Pat. No. 5,805,140 (s.a. http://web.archive.org/web/2001*/http://www.immersion.com/products/custom/laproimpulse.shtml#) in which a pair of grips of a laparoscopic instrument is incorporated. In this device, two rotatory degrees of freedom are provided through a biaxial cardanic suspension. A linear degree of freedom is provided serially with a displaceable carrier element perpendicular to the axes of rotation and at its point of intersection. An additional rotational possibility exists about its axis of displacement in which the stem of the laparoscopic instrument is implemented. The mobility of the pair of grips forms the fifth degree of freedom. The disadvantage with this input device is the complex and essentially serial design of the kinematics with the weak points known to specialists. In addition, corresponding force feedback functions are only provided for the cardanic suspension and for the axis of displacement. The swivelling range which is limited to a few degrees in the practical embodiment, does not allow realistic laparoscopy to a satisfactory degree.

Departing from this state of the art, the underlying object of the invention is to create a parallel kinematic input device with haptic feedback which provides an active actuating function for a real or virtual tool and permits intuitive manipulation true to reality in a simple manner for many applications.

According to the invention, this object is achieved through an input device of the kind named above with the characterising features of claim 1. Advantageous developments are characterised in the subordinate claims with the corresponding dependencies.

Accordingly, the carrier element exhibits a further grip part which is mobile relative to the first grip part. In addition, the grip parts which are mobile in relation to one another are coupled by means of a force-sensitive grip actuator which is preferably connected to the computer. In contrast to the known one-part grips, such as pin-like styli or knobs, any grips can be simulated with a second grip part which combines with the first to form a corresponding pair of grip parts. Preferably, these are grips of manually operated tools and instruments, such as for example scissors, forceps, clamps, syringes or any other tools or instruments with comparable grip faces intended for hands or fingers. Simple buttons, slides or levers are also conceivable when the primary concern is less the gripping purpose but more an actuating purpose, such as for example in the case of a drill. With the pair of grip parts according to the invention, it is advantageous that the operator now no longer has to adapt to unergonomic operating elements (controls) or unfamiliar grips. The device according to the invention allows continued recourse to skills acquired through effort with corresponding tools without the need for adjustment. In particular, surgeons who have to acquire the dexterity for precise operation of medical instruments over many years of ongoing training, profit from the described solution with two grip parts. Virtually any manually operated tool for which at least one joint or articulation is provided for actuation, can be appropriately simulated with two grip parts which are mobile in relation to one another. Here, the actuating direction of the grip parts is preferably parallel to the longitudinal extension of the carrier element, but can also be perpendicular or at any other angle thereto. Obviously, it is also possible to simulate tools which have no actuating mechanism of their own, such as for example a screwdriver or a scalpel. Likewise, this is also possible for tools or machines which are not actuated directly by hand.

Another essential advantage of the input device according to the invention is that the grip parts which are mobile in relation to one another also have haptic feedback by means of an interposed force-sensitive grip actuator. The grip actuators can take the form of drives known per se, such as for example electromagnetic linear or stepper motors. Pneumatic or hydraulic drives are also conceivable for these. It is obvious that the position of such actuators can be altered or set or adjusted in any desired way through appropriate control. As force-sensitive actuators, these have an additional sensing system with which a counteracting load such as for example an opposing force, moved mass and/or friction can be determined. When the grip parts are to be moved towards one another for example, the resistance offered to the tool by the object being worked on during this execution of the tool function can be adequately fed back to the hand or fingers with the aid of a computer unit connected to the grip actuator. This applies equally to other types of movement such as when the grip parts are moved apart, swivelled or twisted. Obviously, it is also possible to simply feel the real or virtual object without working on it. Here, the grip actuator employed can exhibit any degrees of freedom, preferably the same degree or degrees as the grip parts themselves. It is advantageous if the grip actuator simultaneously carries and/or guides at least one of the grip parts with corresponding joints or articulations. Here, the grip actuator can be fastened on or to the carrier element and partly to the grip parts or solely to the grip parts.

The parallel kinematic design principle with a plurality of preferably identical linear actuators frequently employed in the state of the art for working machines is generally not very well known for input devices or for input/output devices. However, compared with devices with serial kinematics, these devices offer comparable advantages such as for example reduced component and maintenance requirements, greater precision and dynamics and easier control. The variable-length linear actuators used can preferably be electromagnetic linear direct drives, or pneumatic or hydraulic linear direct drives. In addition, spindle and rack drives for example are also conceivable, and then only the distance between the articulations is variable and the spindle or rack is of a constant length per se. As force-sensitive actuators, these drives also allow adjustment of deflection and counteracting load.

The linear actuators of the input device according to the invention are connected in the usual way both to the frame and to the carrier element in each case with two rotatory degrees of freedom so that they can swivel by means of articulations such as cardanic, ball head or ball socket joints or an alternative joint to these, with the linear actuators or their actuating members and stators together forming a tripod. A plurality of individual articulations at one point or in a narrow range, as is the case between the carrier element and the vertex of the tripod formed by the linear actuators, is referred to as a multiple articulation. Obviously, the specialist will also find it possible to combine a plurality of such articulations in an actual design, again producing advantages in terms of precision and calculations. The frame itself can be embodied with a plurality of levels or for example be a simple mounting or a flat fastening plate. The carrier element per se is preferably embodied as a straight rod, e.g. in the form of a tube or square profile section. It is also possible for the carrier element to be curved.

According to one particularly preferred form of embodiment in accordance with patent claim 2, in addition to the three articulations already present, three further articulations are provided on the frame. In addition, the further articulation of the carrier element is embodied as a second multiple articulation with three individual or combined articulations. The essential point here is that in addition three further force-sensitive linear actuators are provided which each engage on the second multiple articulation of the carrier element and the three further articulations on the frame. The three linear actuators or their actuating members and stators essentially form a second tripod. Moreover, the first multiple articulation is mobile relative to the second multiple articulation. This means that the two vertices of the tripods are also mobile relative to one another, whereas the six articulations on the frame side or feet of the tripods remain in a constant position relative to one another. A further essential point about the invention is that the six linear actuators or the two tripods combine functionally to form the grip actuator and the two grip parts are each associated constructively with one of the tripods. As is known in the state of the art, here the six articulations on the frame side are located in constant positions relative to one another. However, the multiple articulations on the carrier element and the linear actuators of the first tripod coupled to these are mobile relative to those of the other tripod. Here, it is sufficient for example if the multiple articulations of the first tripod are arranged so as to be displaceable in the axial direction of the carrier element. This can be through a variable-length carrier element, such as a cylinder and piston combination for example, or through a constant-length carrier element with a slide guided on it. Thus, the carrier element can essentially consist of two parts which are mobile relative to one another, with one grip part and the multiple articulation of one tripod associated with or attached to each part of the carrier element. Here, it is advantageous firstly that the degree of freedom of the multi-part carrier element can be used for the grip parts to be moved as a grip articulation or joint. The grip actuator no longer has to guide the grip parts and can be made correspondingly simpler. Secondly, the fact that the linear actuators divided into two tripods can replace the grip actuator completely is a particular advantage. Sufficient degrees of freedom are available for this with six linear actuators. With multiple articulations of the carrier element in fixed positions relative to one another, it is known that only five degrees of freedom are necessary for the mathematical precision of the position/load of the input device. The missing information for the grip position/load is obtained from the position/load of the sixth linear actuator. If the grip position/load remains constant during operation, the sixth linear actuator has a positive effect on the precision and reliability due to the mathematical overdefinition or redundancy. In addition, in this case the stability and the operational reliability of the input device according to the invention are increased.

Basically, it should be noted that the mathematical calculations for control or evaluation of the position/load become particularly simple if in each case three of the linear actuators form an ideal tripod with the carrier element articulated at their vertices. If the axes of the linear actuators intersect at the vertices at least hypothetically at a single point of intersection and this point of intersection lies in the axis of the carrier element, trivial methods of calculation can be used. However, given appropriate mathematical allowance, the linear actuators of the tripods can also run together skew, e.g. if the articulations on the carrier element are arranged next to one another as in the state of the art, or the rotational axes of an articulation do not intersect. If a plurality of articulations are combined constructively in the area of convergence of the tripods, play in joints or articulations can be reduced in an advantageous manner and in addition cost savings can be made.

It is particularly advantageous that the structure of the input device according to the invention, consisting of the frame, linear actuators and carrier element, can be configured variably according to conditions at the place of installation. Thus, it is possible to arrange the portion of the carrier element located between the two multiple articulations outside the two tripods, outside one and inside the other tripod, or inside the two tripods. Preferably, the first configuration should be chosen for test purposes or when a lot of space is available. The last two possibilities can offer more advantages for example when space is restricted, or when installation is partly underneath a desk or overhead.

The respective articulations of the two tripods on the frame side can each secure a frame level, which levels are preferably located parallel with one another and at a distance. The two frame levels can be embodied as rings for example and connected securely to one another through spacers. The mathematical calculations become much simpler if the respective articulations of the tripods on the frame side are the corner points of two equilateral triangles, particularly when the triangles are arranged parallel with one another at a distance, and the straight line connecting the centroids of the triangles is perpendicular to the triangles and the two triangles are swivelled in relation to one another about the connecting line by a sixth of a full circle, i.e. by 60 degrees.

According to an alternative form of embodiment characterised in patent claim 7, only two further articulations are provided on the frame in place of the three further articulations. As in the case of the form of embodiment above, here the further articulation on the carrier element is also embodied as a second multiple or double articulation. Moreover, two further force-sensitive linear actuators are provided which in each case act on the second multiple articulation and on the two further articulations of the frame, with the linear actuators essentially forming a bipod and the distance between the two multiple articulations being constant. Once again, the grouping to form a bipod and a tripod has mathematical advantages. The carrier element itself is of a constant length and preferably made as one part. The grip actuator is arranged to be kinematically independent of the linear actuators on the carrier element so that apart from the mobility of the grip parts, five degrees of freedom are also available for general navigation.

In a further preferred form of embodiment according to patent claim 8, the rod-shaped carrier element is coupled directly or immediately to the frame through its further articulation. Accordingly, the further articulation of the carrier element also forms the articulation on the frame. In addition, the multiple articulation, as in the first embodiment example, is mobile relative to the further articulation, preferably displaceable relative to one another in the axial direction of the carrier element. In addition to the mobility of the grip parts, two rotatory degrees of freedom are available, i.e. swivelling mobility about the further articulation of the carrier element, preferably at one point. The portion of the carrier element located between the multiple articulation and the further articulation (on the frame side), is preferably variable in length, e.g. by means of a cylinder and piston combination. However, the carrier element can also be of constant length, and then it is necessary for this to be embodied so as to be displaceable relative to the further articulation (on the frame side), e.g. embodied as a rack which can be swivelled in the pivot point. With this additional linear degree of freedom in the axial direction of the carrier element, the distance of the two grip parts to the swivelling point, i.e. to the further articulation of the carrier element (on the frame side), can be varied accordingly. This variability can be circumscribed as "immersion" of the grips or the instrument in the object to be worked on. If the grip actuator is arranged directly between the grip parts, i.e. kinematically independent of the tripod, the three linear actuators are also sufficient for the mathematical precision of this additional degree of freedom. This simple input device formed with only three linear actuators is ideally suited for less complex tasks. Thus, for example, longitudinal mobility limited to a predetermined swivelling point is no longer a hindrance for a fairly simple laparoscopic intervention in an abdominal wall.

It is particularly advantageous if the tripod and the grip actuator are each associated with one of the grip parts. By way of example, the carrier element can be embodied as a slide/guide combination, and the first part of this combination is connected firmly to the first grip part and the multiple articulation of the carrier element, while the second part is displaceable relative to the first and connected to the second grip part and the further articulation of the carrier element (on the frame side). Here, the first grip actuator can be arranged in any desired position between the further articulation of the carrier element (on the frame side) and the second grip part. This can be the case for example when a rack is used as the second part of the slide/guide combination directly in the further articulation (on the frame side). Alternatively, the grip actuator can be interposed or incorporated in the carrier element at its action points, and then the carrier element in this portion then virtually represents a fourth active leg.

As in the forms of embodiment named previously, the method of calculation and the complexity of design become simpler with this embodiment as well if the three linear actuators form an ideal tripod with the carrier element articulated at its vertex at least hypothetically.

A further simplification is obtained if the three articulations of the frame and the further articulation of the carrier element (on the frame side) lie in one plane. Here, preferably, the three articulations of the frame are the corner points of an equilateral triangle with the further articulation of the carrier element (on the frame side) arranged in its centroid. The plane or the triangle can also be a level of the frame.

According to one advantageous development of the idea of the invention for all the forms of embodiment described previously, the two grip parts are arranged so as to be rotationally mobile about the carrier element, with a force-sensitive rotational grip actuator provided by means of which at least one of the grip parts is coupled with the carrier element. Preferably, the two grips parts are connected to one another so that they cannot turn so that it is sufficient to couple just one grip part with the grip actuator. With a corresponding rotational movement of the first grip part, the second grip part follows the first forcibly guided in the rotational direction about the carrier element. The flexibility of the input device is increased enormously by the addition of a further rotatory degree of freedom. This allows a rotational movement, e.g. the rotational movement of a screwdriver. In combination with the first grip actuator, complex tasks, such as for example cutting and winding a thread with scissors, can be performed with haptic feedback. A stepper motor can be used as the force-sensitive rotational grip actuator.

In one alternative form of embodiment with an additional rotatory degree of freedom, the carrier element is embodied in at least three parts, with two of the parts rotationally mobile in the multiple articulation and coupled with the third part through a force-sensitive rotational grip actuator. In each case the grip parts can be fastened to the first two parts of the carrier element so that they cannot rotate. Here, the carrier element is preferably embodied as a slide/guide combination, the slide and the guide being fixed so that they cannot rotate in relation to one another but rotationally mobile in combination in the multiple articulation and in the axial direction of the carrier element, e.g. by means of a rotational rim. Again, a stepper motor can be used as the force-sensitive rotational grip actuator. This is interposed between the rotationally mobile parts and the third part, with the third part rotationally fixed to the second multiple articulation or to the further articulation.

According to a further advantageous development, the carrier element projects out of the zone formed by the multiple articulation and the further articulation of the carrier element in the axial direction of the carrier element. Here, at least one grip part is arranged outside this zone. It is possible both to extend the carrier element beyond this zone on one side and arrange both grip parts on this extension, i.e. outside on one side, and also to extend the carrier element on both sides and arrange one of the grip parts on each opposing extension, i.e. outside on both sides. Extending the carrier element means that the grip parts can be arranged outside the zone of movement of the linear actuators. In this case, it is a major advantage that the hand or fingers of the operator can no longer collide with the actuators. In addition, the linear actuators and the frame can be clearly distanced from the grip parts. For example, it is possible to arrange the frame and linear actuators in a compact design below and the grip parts above a desk, with the carrier element projecting through the level of the frame and/or the surface of the desk. It is also advantageous to encapsulate the frame with the linear actuators for example against dust and other environmental factors and only keep the grip parts accessible to the operator.

Depending on the area of use of the input device according to the invention, it can be advantageous if at least one of the two grip parts exhibits at least one gripping opening, e.g. for at least one finger, as in the case of scissors.

Depending on preference and on the tool being used, the operator can work particularly ergonomically by keeping a plurality of grip parts which are arranged with suitable interchangeability on the carrier element. In addition, it is possible to install the individual grip parts permanently and make them neutral. In the latter case, it is preferably possible to switch or change between a plurality of real or virtual tools and/or different tool functions at the press of a button.

Lastly, in one preferred application with the input device according to the invention a real or virtual laparoscopic instrument can be controlled remotely, with the grip parts simulating those of a laparoscopic instrument.

In the following the invention is explained in greater detail on the basis of five embodiment examples with reference to the drawings in which.

Figure 1:
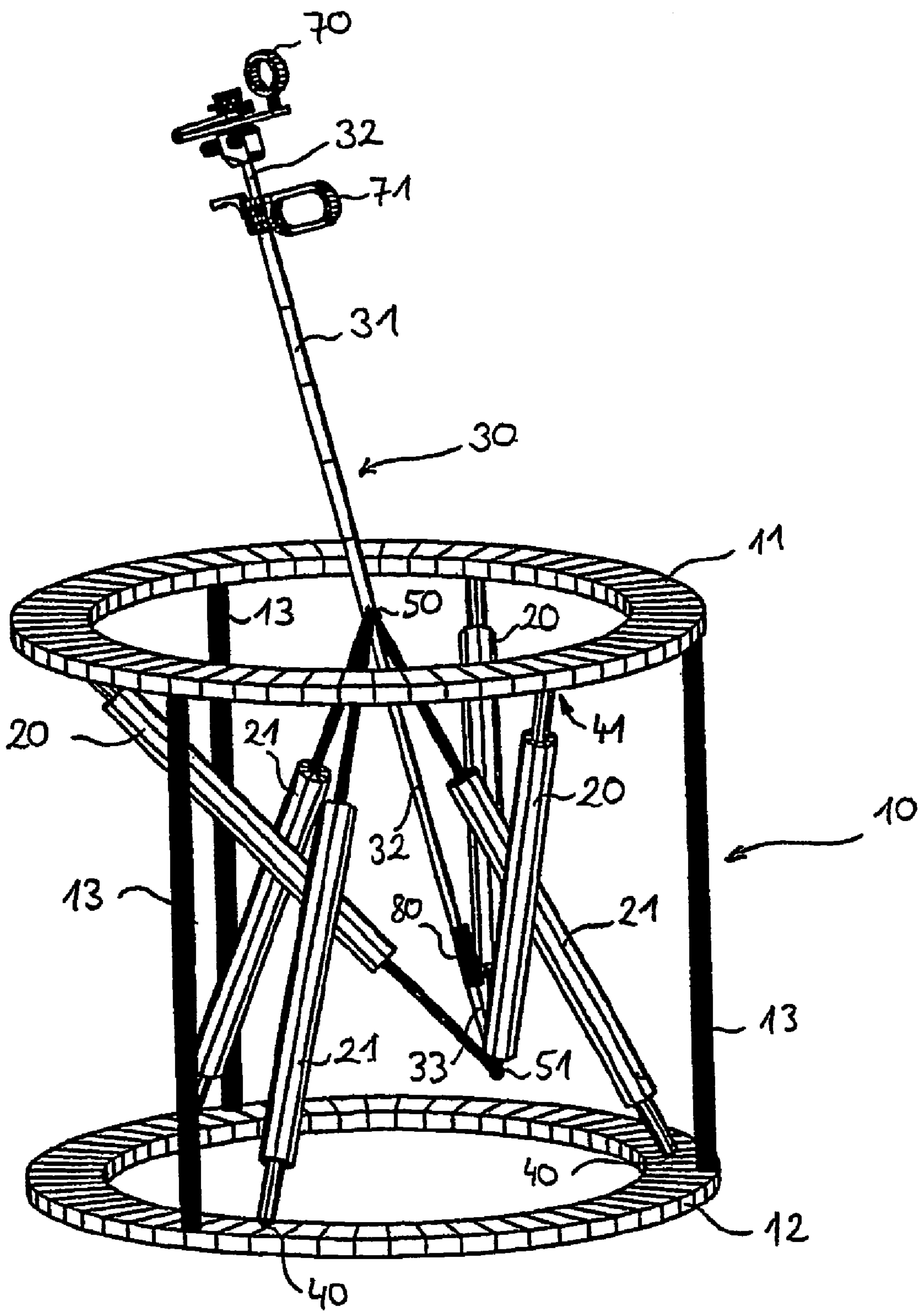
FIG. 1 shows a perspective illustration of a first embodiment example with two tripods.

FIG. 1 shows the fundamental construction of one particularly preferred embodiment example of the input device according to the invention with a fixed frame 10 and a rod-shaped carrier element 30 which is mobile relative to it. The frame 10 and the carrier element 30 are connected to one another by means of six independent linear actuators 20 and 21 which are adjustable in length and of the same design. It should be recognised that the frame 10 exhibits a lower and an upper frame ring 11 and 12. These are spaced parallel and in the same alignment in relation to one another by means of three spacers 13 arranged perpendicularly on these with uniform spacing in the circumferential direction. The frame rings 11 and 12 are in each case connected to the first ends of the three linear actuators 20 and 21 through articulations 41 and 40 which are only illustrated diagrammatically and of which only two are visible in FIG. 1, so as to be mobile by swivelling with two rotatory degrees of freedom, such as for example with ball or cardan joints. It should be recognised that the three articulations 40 and the three articulations 41 on the frame rings 11 and 12 form two equilateral triangles which are swivelled through 60 degrees in relation to one another.

It can also been seen that the three linear actuators 20 form a first group of three and the three linear actuators 21 a second group of three, in each case in the form of a tripod which essentially tapers to a point and has a regular base area, with the two tripods arranged in opposite directions to one another and interlinked in a uniform arrangement. In the zones of convergence of the first and second tripods, the linear actuators 20 and 21 are connected by their second ends through multiple articulations 51 and 50 respectively not shown in detail to the lower end of an articulating element 33 or the lower end of a slide element 31 of the carrier element 30, in each case mobile by swivelling with two rotatory degrees of freedom, as for example with a ball or cardan joint. Here, the articulating element 33 is provided so as to be rotationally fixed in relation to the multiple articulation 51 and the second ends of the linear actuators 20 in its own axial direction or carrier element direction, whereas at the lower end of the slide element 31 there is also an interposed rotational joint which is not shown and which allows the slide element 31 to rotate about its own axis or in the carrier element direction in relation to the multiple articulations 50 or the second ends of the linear actuators 21. The rotational joint, such as a rotational rim for example, is preferably combined structurally with the multiple articulation 50.

FIG. 1 also shows that the carrier element 30 also exhibits a guide element 32 which is guided in portions in the tubular slide element 31 so as to be rotationally fixed and is displaceable in relation to the latter. A rotational grip actuator or stepper motor 80 is arranged between the lower end of the guide element 32 and the upper end of the articulating element 33. This stepper motor 80 couples the guide element 32 and the slide element 31 with the articulating element 33 so as to be rotationally mobile about the axis of the carrier element.

Lastly, the slide element 31 and the portion of the guide element 32 which is located outside the two tripods, form an extension which projects out of the zone or portion of the multiple articulations 50 and 51 on one side. At the same time, the extension passes through the upper frame ring 11. On one side a first grip part 70 is fastened to the extension or to the upper end of the slide element 31, and a second grip part 71 is fastened to the upper end of the guide element 32, these together forming a pair of grip parts which can be displaced relative to one another. The two grip parts exhibit gripping openings which are laterally distanced from the carrier element 30, with the gripping opening of the first grip part 70 provided for a thumb and the gripping opening of the second grip part 71 for the index and middle finger of one hand of an operator.

If the two grip parts 70 and 71 are pressed together for example by manual actuation, the multiple articulations 50 and 51 move away from one another. If this happens by pressing the first grip part 70 down on to the second grip part 71 without the position and orientation of the second grip part altering physically in the process, the guide element 32 is displaced an amount by the slide element 31 which is in a constant position, and causes a change in the length and orientation of the linear actuators 20 through the multiple articulation 51. If the compression of the grip parts 70 and 71 is produced by pulling the second grip part upwards to the positionally fixed first grip part, the slide element 31 is drawn upwards along the guide element with the multiple articulation 50, and as a result of this the length and orientation of the linear actuators 21 change accordingly. If the compression of the grip parts 70 and 71 is produced by an absolute movement of the two grip parts, the length and orientation of all six linear actuators 20 and 21 are changed. The same applies if the two grip parts are moved together in space without being actuated, and in this particular case only the orientation of the carrier element 30 is changed and the distance between the multiple articulations 50 and 51 remains constant. The rotational mobility of the two grip parts 70 and 71 about the axis of the carrier element is provided by the stepper motor 80. If the two grip parts are turned about this axis, the slide element 31 and the guide element 32 rotate both in relation to the multiple articulation 50 and the second ends of the linear actuators 21 and also in relation to the articulating element 33 and the multiple articulations 51 and the second ends of the linear actuators 20.

It should also be noted that this embodiment example with the six linear actuators 20 and 21 and the stepper motor 80 has six, i.e. three translatory and three rotatory, active spatial degrees of freedom and one active translatory actuating degree of freedom, and the grip actuator is replaced by combining the linear actuators and accordingly cannot be shown separately.

Figure 2:
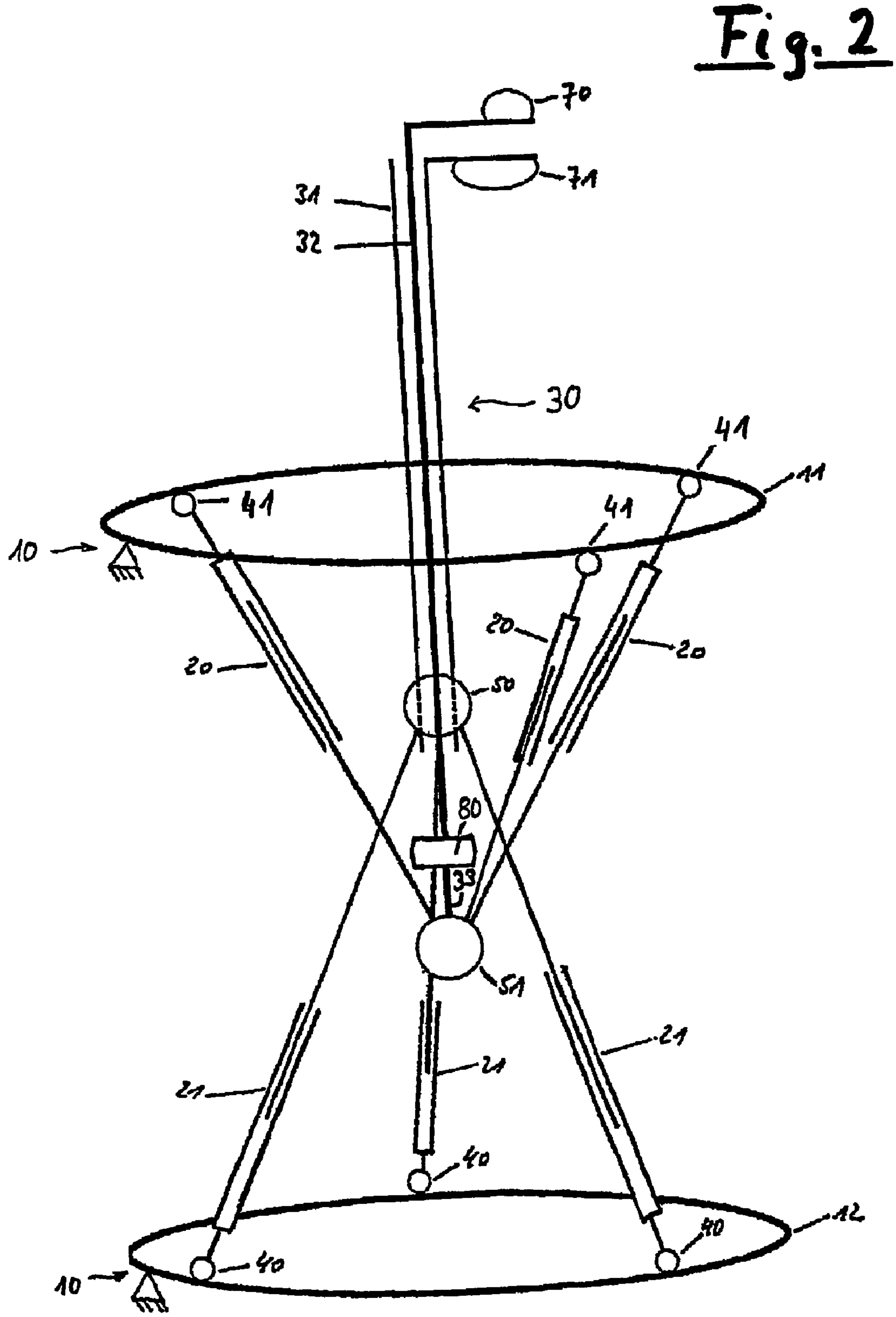
FIG. 2 shows a diagrammatic illustration according to FIG. 1.

FIG. 2 shows a diagrammatic illustration of the first form of embodiment according to FIG. 1. The common frame 10 is only indicated. However, all six articulations 40 and 41 on the frame side can be seen on the upper frame ring 11 and the lower frame ring 12. The two tripods of the linear actuators 20 and 21 are located roughly in a symmetrical starting position, with the carrier element 30 pointing vertically upwards. The multiple articulations 50 and 51 are each associated jointly with the two ends of the linear actuators 20 and 21. The central axis of the carrier element and the axes of the linear actuators 20 and 21 intersect there ideally at a single point. Each of the linear actuators 20 and 21 is mobile by swivelling at the respective point with two rotatory degrees of freedom. Lastly, it can clearly be seen that the slide element 31 is guided displaceably in the guide element 32, and that both the slide element 31 and the guide element 32 pass through the multiple articulation 50.

Figure 3:
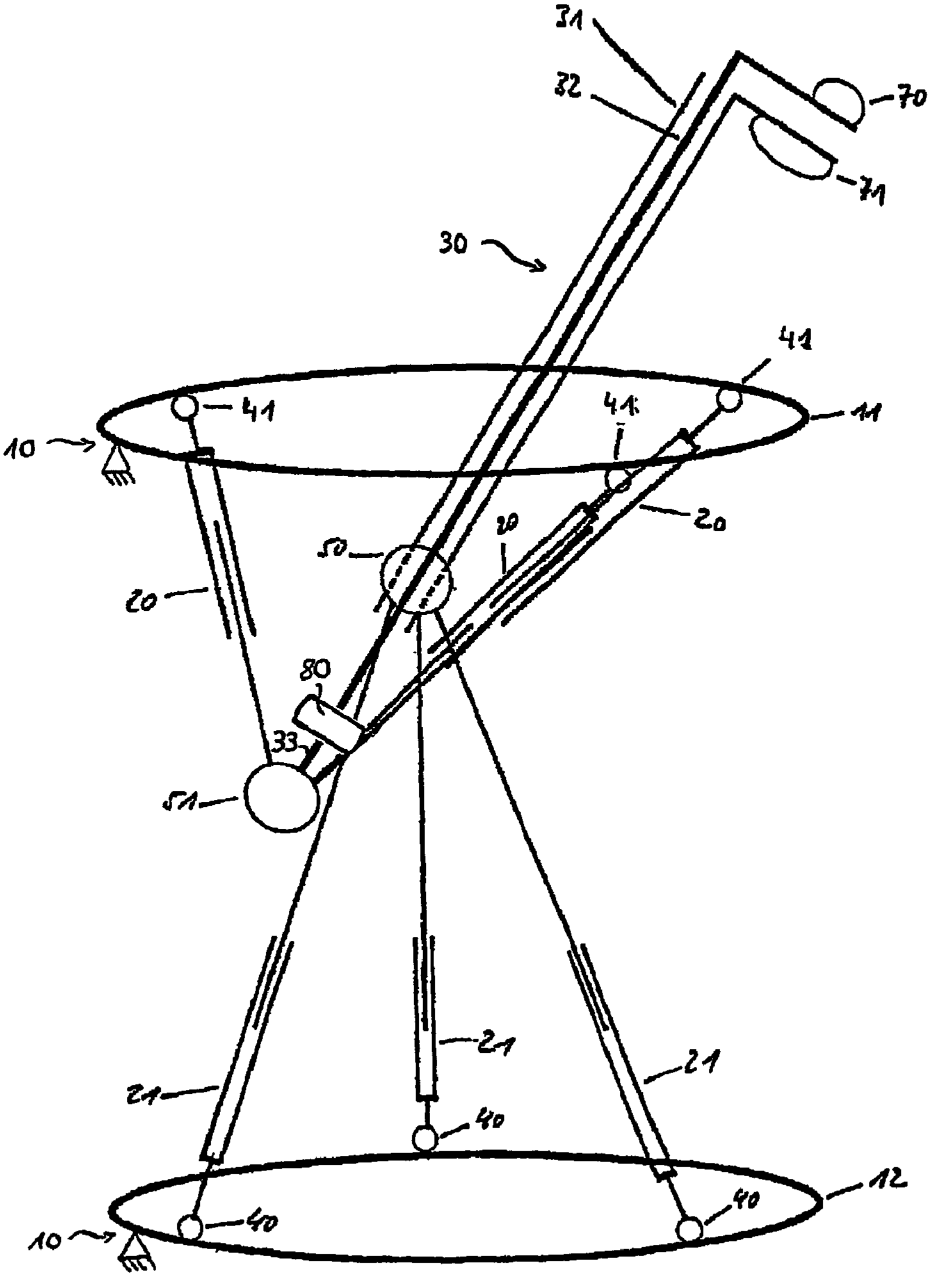
FIG. 3 shows a diagrammatic illustration according to FIG. 1.

FIG. 3 also shows the first form of embodiment according to FIG. 1, but the tripods of the linear actuators 20 and 21 and the carrier element 30 are clearly deflected in relation to the position in FIG. 2. It can be seen that the linear actuators 20 exhibit sharply different lengths, and that the second multiple articulation 51 is located outside the volume of the tripod formed by the linear actuators 21.

Figure 4:
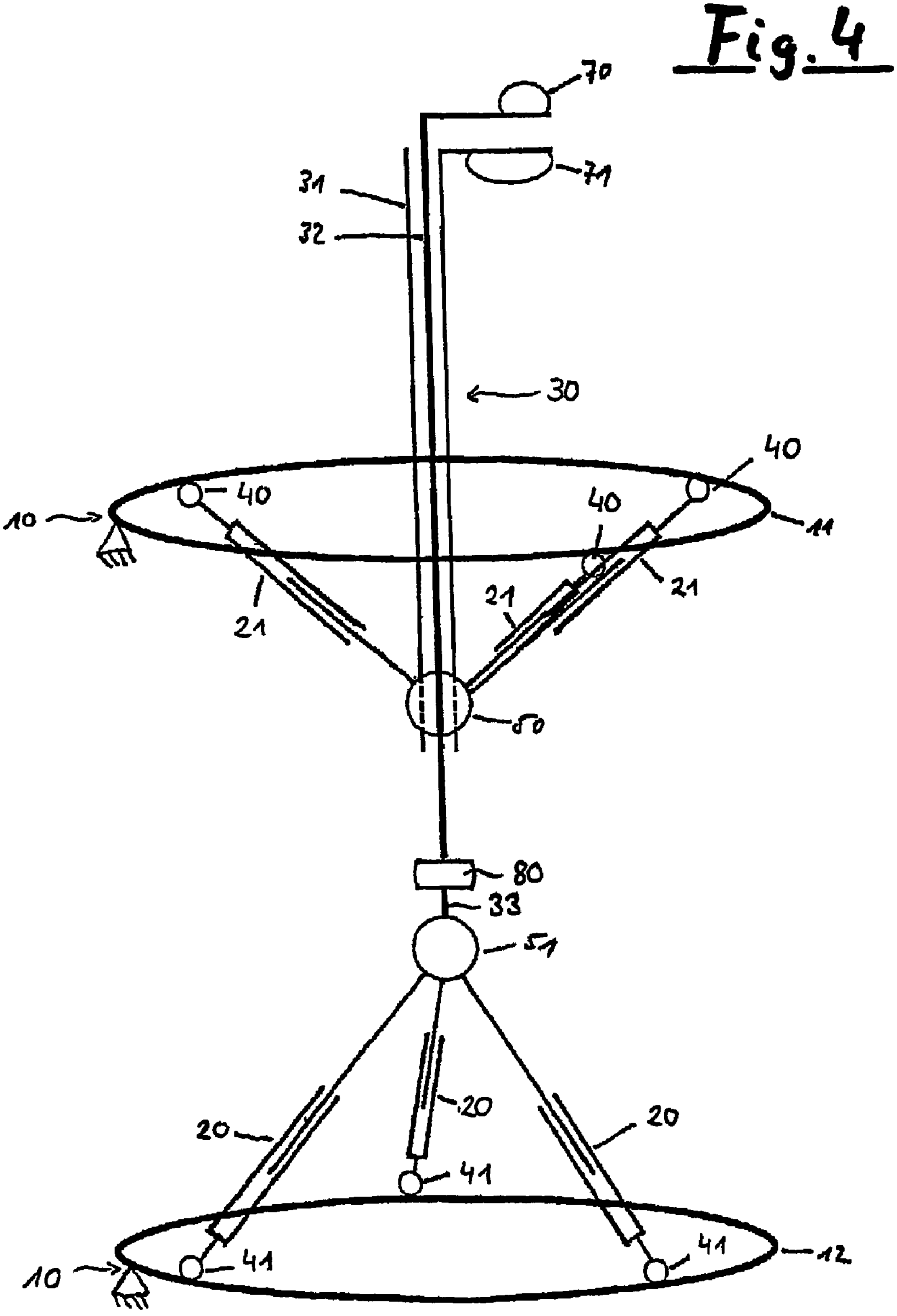
FIG. 4 shows a diagrammatic illustration of a second embodiment example with two tripods in an alternative configuration.

FIG. 4 shows a second embodiment example with two tripods in an alternative configuration, in which it can be seen that the zone of the carrier element 30 between the two multiple articulations 50 and 51 is arranged outside the two tripods. However, the orientation of the two tripods is the same as in the first embodiment example, i.e. facing one another.

Figure 5:
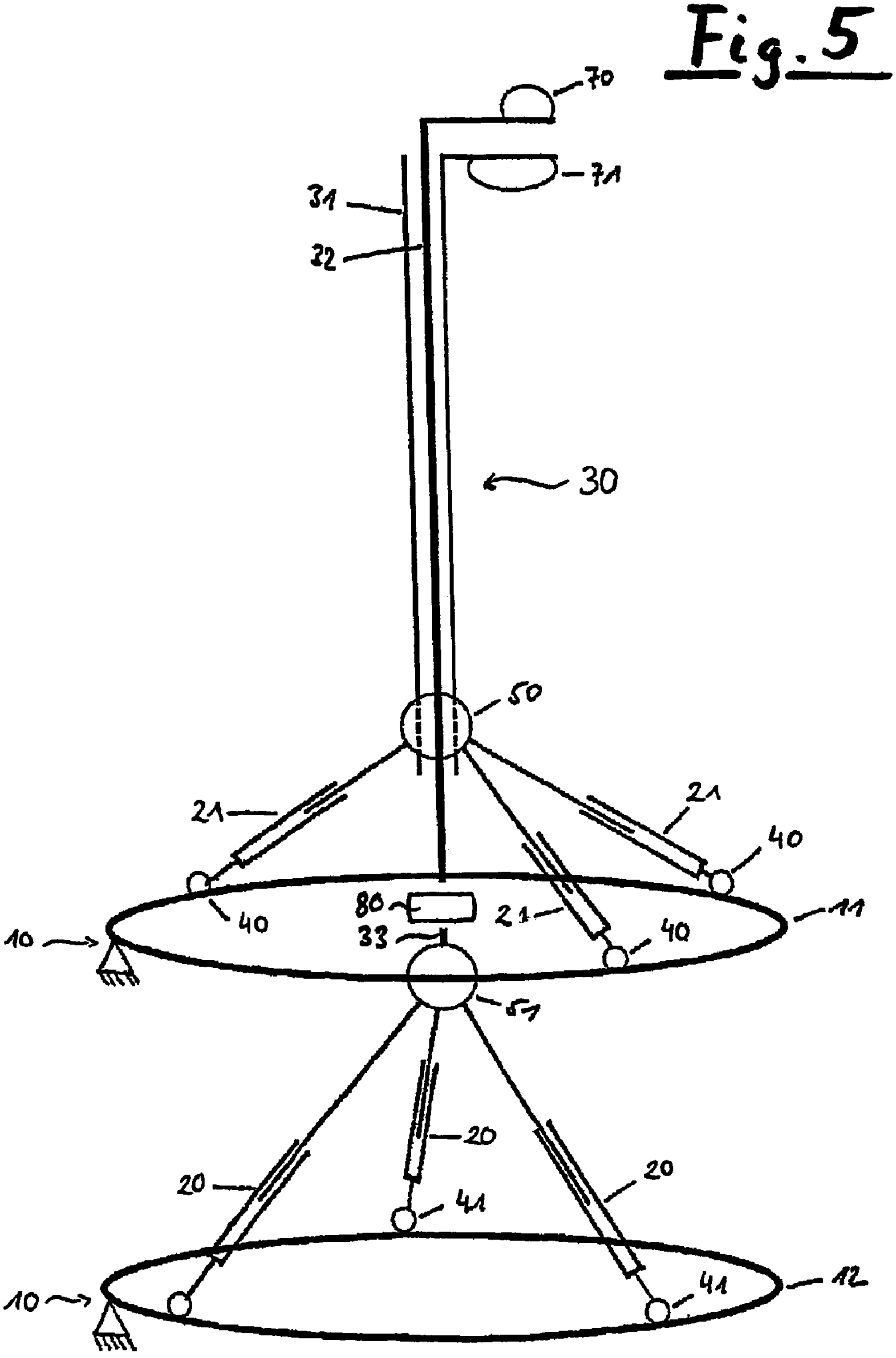
FIG. 5 shows a diagrammatic illustration of a third embodiment example with two tripods in an alternative configuration.

FIG. 5 shows a third embodiment example with two tripods in an alternative configuration, in which it can be seen that the zone of the carrier element 30 between the two multiple articulations 50 and 51 is again arranged outside the two tripods. This time, the two tripods are oriented the same, i.e. the vertices of the tripods each point upwards.

Figure 6:
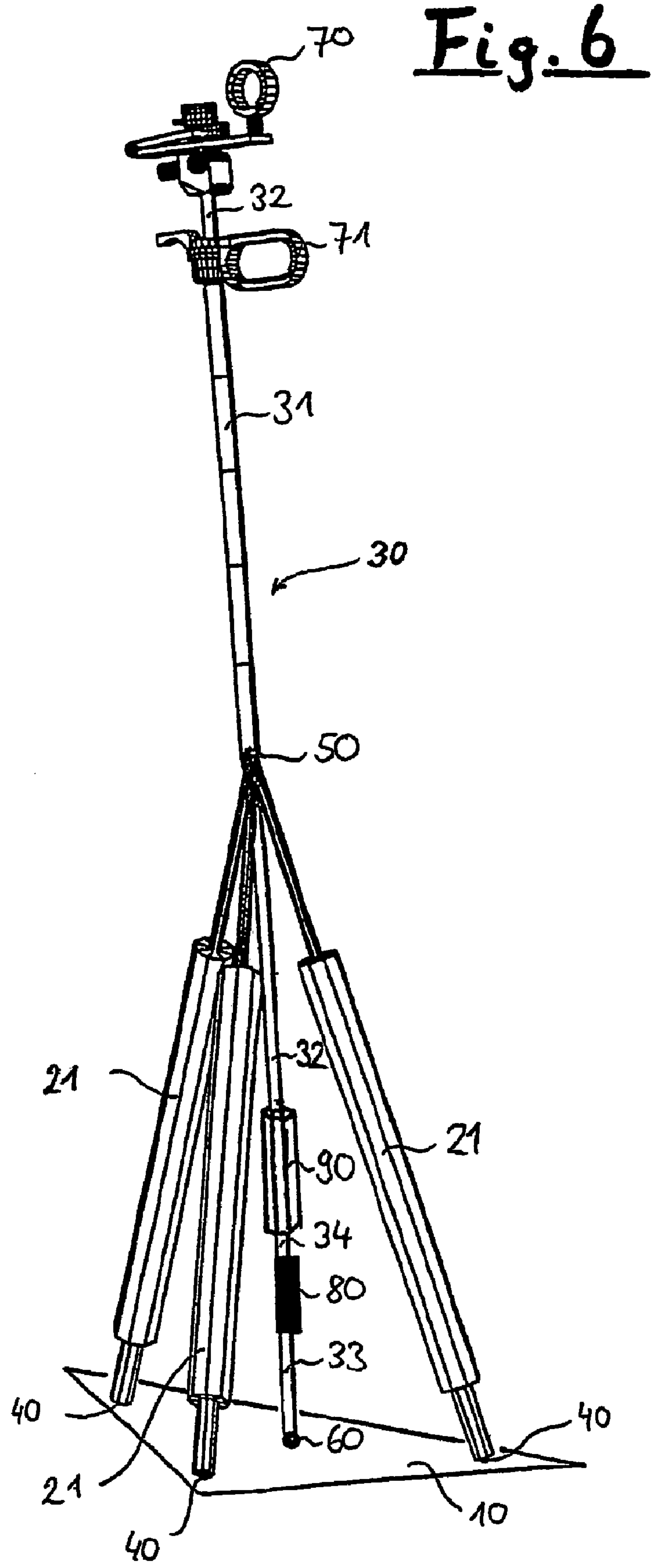
FIG. 6 shows a perspective illustration of a fourth embodiment example with only one tripod.

FIG. 6 shows the fundamental construction of a fourth advantageous embodiment example of the input device according to the invention, again with a fixed frame 10 and a rod-shaped carrier element 30 which is mobile relative to it. However, the frame 10 and the carrier element 30 are only connected to one another through three independent linear actuators 21 which are adjustable in length and of the same design. It can be seen that in this embodiment example the frame 10 is embodied as a triangular plate. Here, the lower ends of the linear actuators 20 are connected to the frame 10 through three articulations 40 which are only shown diagrammatically, so as to be mobile by swivelling with two rotatory degrees of freedom. The articulations 40 define an equilateral triangle.

It can also be seen that the three linear actuators 21 form a group of three in the form of a tripod which has a regular base area and essentially tapers to a point. In the zone of convergence of the tripod, the linear actuators 21 are connected by their upper end through a multiple articulation 50 not shown to the lower end of a slide element 31 of the carrier element 30, in each case mobile by swivelling with two rotatory degrees of freedom. As in FIG. 1, here at the lower end of the slide element 31 there is also an interposed rotational joint which is not shown and which allows the slide element 31 to turn about its own axis in relation to the multiple articulation 50 and the upper ends of the linear actuators 21. As in FIG. 1, the carrier element 30 exhibits a guide element 32 which is guided in portions in the tubular slide element 31 so that it cannot turn and is displaceable in relation to the latter.

In contrast to the embodiment example in FIG. 1, the carrier element also exhibits an intermediate element 34, with a grip actuator 90 with a translatory degree of freedom in the axis of the carrier element interposed between the lower end of the guide element 32 and the upper end of the intermediate element 34. Here, the grip actuator 90 itself can be embodied like a linear actuator, which alters or detects the overall length of the carrier element 30 between the guide part 32 and the intermediate part 34.

A stepper motor 80 is interposed between the lower end of the intermediate element 34 and the upper end of an articulating element 33, as in FIG. 1. However, in this embodiment example the lower end of the articulating element 33 is connected directly to the frame 10 through a further articulation 60 of the carrier element (on the frame side) so as to be mobile by swivelling with two rotatory degrees of freedom. Again, the articulating element 33 is rotationally fixed in relation to the frame 10 in the axial direction of the carrier element. The articulation 60 is arranged in the areal centroid of the equilateral triangle of the articulations 40. As in FIG. 1, the slide element 31 and the portion of the guide element 32 which is located outside the tripod, form an extension which projects out of the zone or portion of the multiple articulation 50 and the articulation 60 on one side. Arranged on the extension in the same way are grip parts 70 and 71, whose rotational mobility together with the slide element 31 and the guide element 32 in relation to the articulating element 33 and the multiple articulation 50 and the upper ends of the linear actuators 21 is as in FIG. 1.

If the two grip parts 70 and 71 are moved further apart or opened for example by manual actuation in that only the second grip part 71 is pressed down and the first grip part 70 remains in a constant position, the slide element 31 moves downwards along the guide element 32 and the gap between the multiple articulation 50 and the articulation 60 is reduced, during which both the length of the grip actuator 90 and the length of the linear actuators 21 are reduced accordingly. Here, the orientation of the linear actuators 21 also alters.

If the opening is produced by pulling the first grip part 70 upwards in relation to the second grip part 71 without the spatial position and orientation of the second grip part and the slide element 31 changing, only the guide element is drawn upwards with it, and the distance between the multiple articulation 50 and the articulation 60 and the lengths and orientations of the linear actuators 21 remain constant and only the overall length of the guide element 32 is increased by the grip actuator 90. If the opening of the grip parts 70 and 71 is produced by an absolute movement of both grip parts, the length and orientation of all three linear actuators 21 and the length of the grip actuator 90 are altered, as in the first case. If the two grip parts 70 and 71 are moved together in space, with or without being actuated, the orientation of the carrier element 30 together with the grip actuator 90 also changes. Therefore, the grip actuator 90 can also be described as the fourth leg of the input device. The rotational mobility is provided by means of a rotational grip actuator 80, as in the embodiment example in FIG. 1, with the grip actuator 90 and the intermediate element 34 coupled to the rotational movement. The order of the grip actuator and rotational grip actuator along the carrier element could also be changed.

The embodiment example illustrated in FIG. 1, with the three linear actuators 21, the rotational grip actuator or stepper motor 80 and the grip actuator 90, provides three, i.e. one translatory and two rotatory, active spatial degrees of freedom and one active translatory actuating degree of freedom.

The actuators of the input devices illustrated in FIGS. 1 and 6 can be connected to a computer not shown and in additional optionally to a motorised tool.

Figure 8:
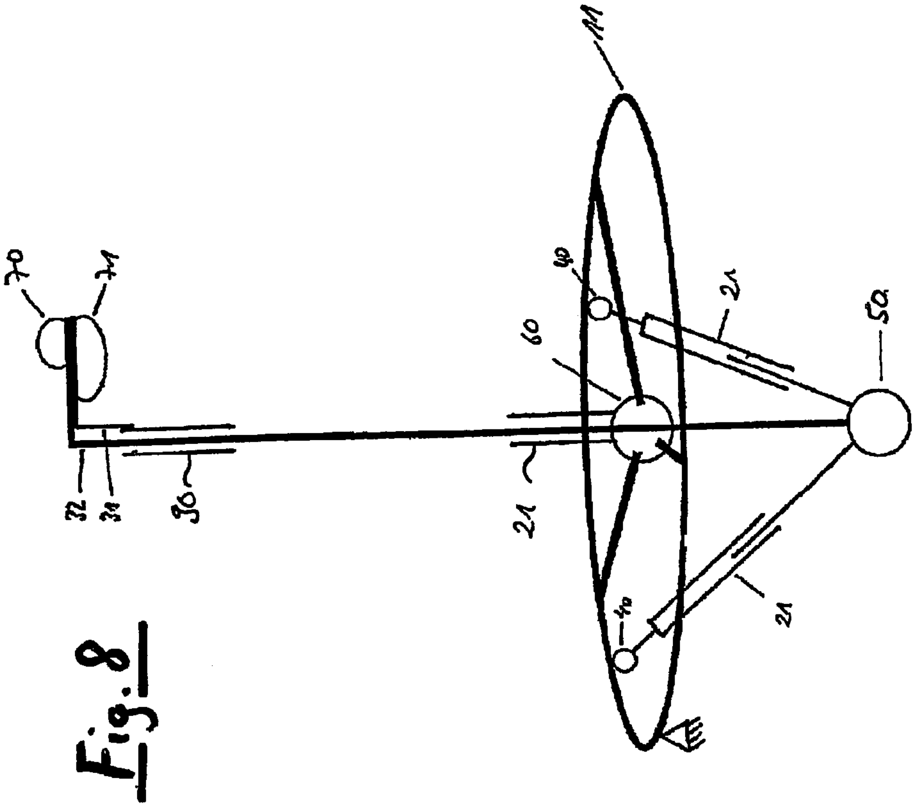
FIGS. 7, 8 show a diagrammatic illustration of a fifth embodiment example with a bipod.
Figure 7:
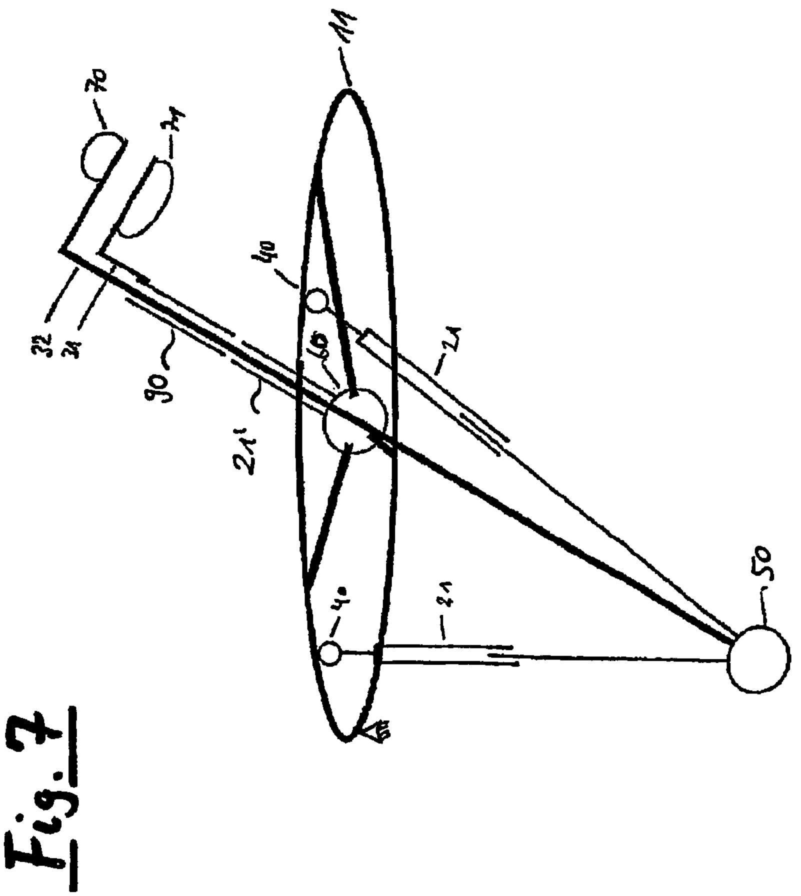

Lastly, FIGS. 7 and 8 show a fifth form of embodiment of an input device with a bipod. A frame 10 exhibits an upper frame ring 11 on which two articulations 40 are provided on the frame side. A first multiple articulation 50 and a further articulation 60 (on the frame side) are provided on a carrier element 30. The frame 10 and the carrier element 30 are connected to one another by means of two force-sensitive linear actuators 21 so as to be able to move, with the linear actuators in each case interposed between the articulations 40 and the multiple articulation 50, forming a bipod. An additional force-sensitive linear actuator 21', which performs the function of the third linear actuator in the fourth embodiment example, is arranged at the articulation 40.

LIST OF REFERENCES

10 Frame
11 Upper frame ring
12 Lower frame ring
13 Spacer
20 Linear actuator of the first tripod
21 Linear actuator of the second tripod
30 Carrier element
31 Slide element
32 Guide element
33 Articulating element
34 Intermediate element
40 Articulation to the second tripod on the frame side
41 Articulation to the first tripod on the frame side
50 First multiple articulation on the carrier element
51 Second multiple articulation on the carrier element
60 Further articulation of the carrier element (on the frame side)
70 First grip part
71 Second grip part
80 Rotational grip actuator, stepper motor
90 Grip actuator

What is claimed is:

1. Input device operating on the parallel kinematic principle with haptic feedback for a computer, in particular for medical teleoperation with instruments, with a frame (10) which has three articulations (40), with a rod-shaped carrier element (30) which has a multiple articulation (50) and a further articulation (51; 60), with the carrier element (30) coupled to the frame (10) so as to be mobile by means of three force-sensitive linear actuators (21) which in each case act on the multiple articulation (50) and on the articulations (40) of the frame (10), forming a tripod, and with the rod-shaped carrier element (30) additionally coupled to the frame (10) by means of the further articulation (51; 60) as well so as to be able to move, and with a grip part (70) arranged on the carrier element, characterised in that the carrier element (30) has a further grip part (71) which is mobile relative to the first grip part (70), force-sensitive grip actuator (20, 21; 90) is provided, and least one of the grip parts (70, 71) is coupled to the force-sensitive grip actuator (20, 21; 90).

2. Input device according to claim 1, characterised in that the frame (10) has three further articulations (41), the further articulation of the carrier element (30) is a second multiple articulation (51), three further force-sensitive linear actuators (20) are provided which each act on the second multiple articulation (51) and on the further articulations (41) of the frame (10), forming a second tripod, the first multiple articulation (50) is mobile relative to the second multiple articulation (51), the two tripods form the first grip actuator (20, 21), and the two grip parts (70, 71) are each associated with a tripod.

3. Input device according to claim 2, characterised in that the portion of the carrier element (30) which is located between the two multiple locations (50, 51), is arranged outside the two tripods or outside one and inside the other tripod or inside the two tripods.

4. Input device according to claim 2, characterised in that the respective articulations (40, 41) of the two tripods on the frame side each secure a frame level.

5. Input device according to claim 4, characterised in that the respective articulations (40, 41) of the two tripods on the frame side are the corner points of two equilateral triangles.

6. Input device according to claim 5, characterised in that the equilateral triangles are arranged parallel to one another at a distance, the straight line connecting the centroids of the triangles is perpendicular to the triangles and the two triangles are swivelled in relation to one another about the connecting straight line by a sixth of a full circle.

7. Input device according to claim 4, characterised in that the carrier element (30) extends through at least one frame level.

8. Input device according to claim 1, characterised in that the frame has two further articulations, the further articulation of the carrier element is a second multiple articulation, two further force-sensitive linear actuators are provided which in each case act on the second multiple articulation and on the further articulations of the frame, forming a bipod, and the first multiple articulation is a constant distance from the second multiple articulation.

9. Input device according to claim 1, characterised in that the carrier element (30) is coupled through its further articulation (60) directly to the frame (10), and in that the multiple articulation (50) is mobile relative to the further articulation (60).

10. Input device according to claim 9, characterised in that the tripod and the grip actuator (90) are each associated with one of the grip parts (70, 71).

11. Input device according to claim 9, characterised in that the articulations (40) on the frame side and the further articulation (60) lie in one frame level.

12. Input device according to claim 9, characterised in that the articulations (40) on the frame side are the corner points of an equilateral triangle, and the further articulation (60) lies in the centroid of the triangle.

13. Input device according to claim 1, characterised in that the two grip parts (70, 71) are arranged so as to be rotationally mobile about the carrier element (30) and in that a force-sensitive rotational grip actuator (80) is provided by means of which at least one of the grip parts (70, 71) is coupled to the carrier element (30).

14. Input device according to claim 1, characterised in that the carrier element (30) is in at least three parts, with two of the parts (31, 32) rotationally mobile in the multiple articulation (50) and coupled to a third part (33) by means of a force-sensitive rotational grip actuator.

15. Input device according to claim 1, characterised in that in its axial direction the carrier element (30) has only one extension or two opposing extensions which project beyond the gap between the multiple articulation (50) and the further articulation (51, 60), and in that the just one extension has two grip parts (70, 71) or the two extensions each have one of the two grip parts (70, 71).

16. Input device according to claim 1, characterised in that at least one of the two grip parts (70, 71) has at least one gripping opening.

17. Input device according to claim 1, characterised in that at least one of the two grip parts (70, 71) is interchangeable with another grip part.

18. Input device according to at least one of the preceding claims, characterised in that the two grip parts (70, 71) simulate those of a laparoscopic instrument and in that the input device can be used for remote operation of a real or virtual laparoscopic instrument.

* * * * *